United States Patent [19]
Pandelisev et al.

[11] Patent Number: 5,229,613
[45] Date of Patent: Jul. 20, 1993

[54] EXTENDED LIFETIME SCINTILLATION CAMERA PLATE ASSEMBLY

[75] Inventors: Kiril A. Pandelisev, Mesa, Ariz.; Sully T. Hightower, La Jolla, Calif.; Tim Fitzgerald, Tempe, Ariz.

[73] Assignee: Horiba Instruments, Incorporated, Irvine, Calif.

[21] Appl. No.: 755,815

[22] Filed: Sep. 6, 1991

[51] Int. Cl.$^5$ .................. G01T 1/161; G01T 1/202
[52] U.S. Cl. ............................ 250/368; 250/363.02
[58] Field of Search .......... 250/368, 367, 369, 363.02, 250/363.10

[56] References Cited

U.S. PATENT DOCUMENTS

| | | | |
|---|---|---|---|
| Re. 28,451 | 6/1975 | Spleha et al. | 250/366 |
| 3,011,057 | 11/1961 | Anger | 250/71 |
| 3,683,180 | 8/1972 | Martone et al. | 250/71 |
| 3,745,359 | 7/1973 | Martone | 250/369 |
| 3,919,556 | 11/1975 | Berninger | 250/366 |
| 4,029,964 | 6/1977 | Ashe | 250/368 |
| 4,068,126 | 1/1978 | Wilson | 250/363 |
| 4,090,081 | 5/1978 | Yakami et al. | 250/368 |
| 4,208,577 | 6/1980 | Wang | 250/213 VT |
| 4,221,967 | 9/1980 | Wang et al. | 250/363 |
| 4,284,891 | 8/1981 | Pergrale et al. | 250/368 |
| 4,656,359 | 4/1987 | Persyk et al. | 250/486 |
| 4,682,033 | 7/1987 | Martin et al. | 250/363 |

FOREIGN PATENT DOCUMENTS

| | | |
|---|---|---|
| 3436916 | 4/1986 | Fed. Rep. of Germany . |
| 2084169 | 9/1981 | United Kingdom . |

Primary Examiner—Paul M. Dzierzynski
Assistant Examiner—Richard Hanig
Attorney, Agent, or Firm—Poms, Smith, Lande & Rose

[57] ABSTRACT

A novel extended lifetime scintillation camera plate assembly and method for manufacture thereof is disclosed, the assembly comprising a body having a plurality of scintillating elements to receive the incoming radiation and produce light, and a plurality of light conducting elements coupled to the scintillating elements to receive and guide the light, and a frame which is sealed around the body by means of solder or laser weld joints thereby eliminating the need for temperature and moisture unstable epoxy resin sealing techniques.

22 Claims, 2 Drawing Sheets

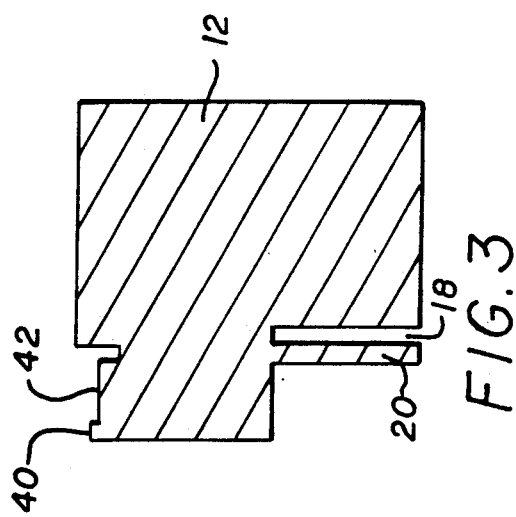
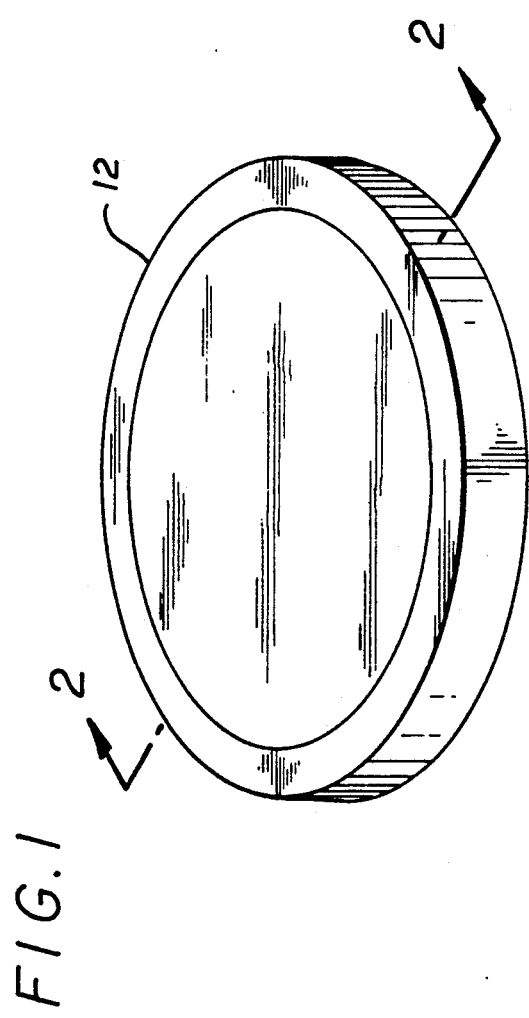
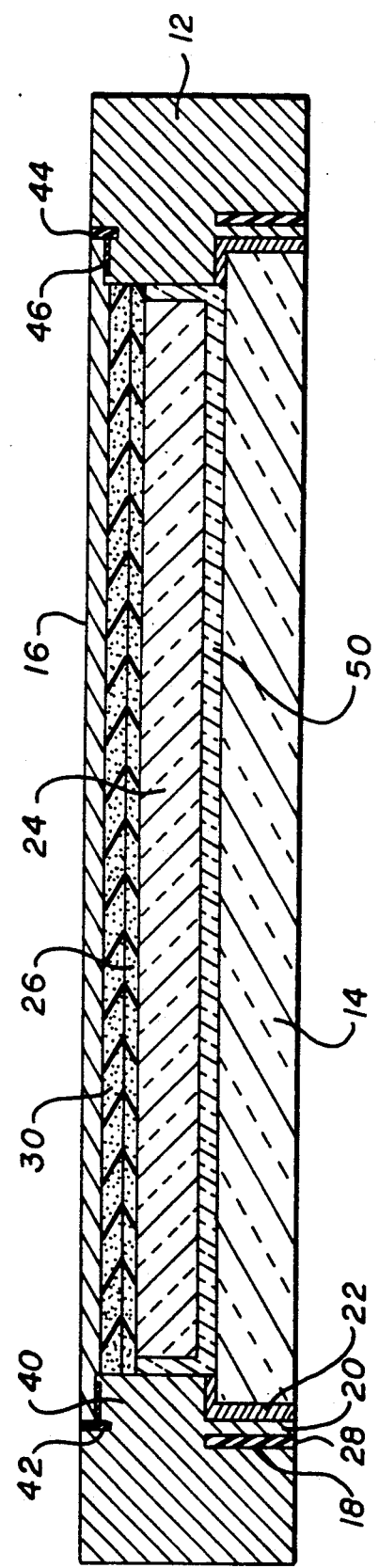

EXTENDED LIFETIME SCINTILLATION CAMERA PLATE ASSEMBLY

FIELD OF THE INVENTION

The present invention relates to a novel method for sealing a scintillation crystal in a camera plate assembly used to detect gamma radiation. This approach results in a camera plate assembly having 4-5 times extended lifetime due to its superior seal and simplified design to the standard state-of-the-art assemblies.

BACKGROUND OF THE INVENTION

The present invention relates to scintillation cameras and more particularly to a gamma camera equipped with a novel extended lifetime gamma camera plate assembly.

Reference is initially made to H. O. Anger U.S. Pat. No. 3,011,057 granted Nov. 28, 1961 which discloses a "Radiation Image Device", for detecting gamma rays. Such devices may be used, for example, to image the distribution of gamma ray emitting isotopes administered previously into the body of a patient for diagnostic purposes.

The conventional gamma camera senses the two-dimensional coordinates of a gamma-ray radiation source as photons interact in a large area detector and forms an image through the detection of numerous photons over the exposure time. The detector medium consists of a flat single scintillation crystal. Photons impacting the scintillation crystal cause the scintillation material to emit visible light. The light generated by the scintillation crystal is then sensed by a photodetector, such as an array of photomultiplier tubes, that cover one of faces of the scintillation crystal. The two-dimension position of the radiation source is resolved from the relative magnitude of the signals produced from the photodetector. A specially designed collimator is used to restrict the gamma rays striking the photodetector so that the resulting image can be directly interpreted as the spatial distribution of the emitting isotope.

Various types of gamma camera plate assemblies are presently available, see FIG. 6. The most common utilizes a thallium-activated sodium iodide crystal plate sealed inside an enclosing ring by an aluminum plate on one side and a glass plate on the other side to protect the crystal against moisture. The sealing is normally done by using resin, e.g. U.S. Pat. No. 3,919,556 to Berninger, or by employing machine screws embedded in a potting compound, e.g. U.S. Pat. No. 4,029,964 to Ashe, or the like. However, the use of epoxy resin or potting compounds produce an assembly which is not stable after long-term usage. Both types of substances are unstable with respect to changes in temperature and humidity, which leads eventually to leakage of moisture into the camera plate space.

Any moisture absorbed by the crystal upon failure of the sealing material causes the crystal to become cloudy, degrading performance and thereafter unsuitable for imaging purposes. The present scintillation crystal assembly lifetime expectancy is approximately one to two years.

Such a damaged plate cannot be repaired. The system can be brought to working order only after a new camera plate assembly, including new light pipe, photomultipliers, etc. are installed in the gamma camera system.

The new design and method for camera plate fabrication will allow a lifetime of 10 years or more. This will result in savings of up to $200,000 for the gamma camera producers over the life duration of the extended lifetime scintillation camera plate assembly.

The replacement process is very costly. For example, the approximate replacement cost of a gamma camera plate assembly on a commercial site such as a hospital can run up to $50,000.00, not including downtime costs.

Furthermore, the great number of steps and parts used in current gamma camera plate assemblies adds substantially to the cost of conventional gamma cameras.

SUMMARY OF THE INVENTION

In view of the foregoing, it is a primary object of the present invention to disclose and provide an extended lifetime, scintillation camera plate assembly housing a scintillator crystal such as thallium-activated sodium iodide or the like.

It is an object of the present invention to provide and disclose a temperature and moisture stable gamma camera plate assembly.

Another object of the invention is to provide a compact, easy to construct, maintain, and handle gamma camera plate assembly, and an assembly technique which is adaptable to any gamma camera presently used, e.g. to those manufactured by Siemens, Picker, Ohio Nuclear, General Electric and the like.

A further object of the present invention is to disclose and provide a gamma camera plate assembly which is easier and more economical to fabricate.

Another object of the invention is to disclose a novel gamma camera plate assembly which will eliminate the need for the utilization of specially trained technicians during the manufacturing process.

Still another object of the present invention is to provide a gamma camera plate assembly which will have improved radiation sensing capability.

More specifically, it is a primary object of the present invention to provide a scintillation camera plate assembly which is more effectively sealed against penetration of water vapor than previous scintillation camera plate assemblies. It is a further object of the present invention to create a scintillation camera plate assembly having a seal that last substantially longer than previous scintillation plate assemblies.

It is also an object of the present invention to provide a more efficient scintillation camera plate assembly that reflects optical light generated by the scintillation crystal more efficiently than previous scintillation camera plate assemblies.

It is also a primary object of the present invention to disclose a superior method and process for sealing scintillation camera plate assemblies and other similar apparatus.

It is also a primary object of the present invention to provide a scintillation camera plate assembly having a greater efficiency in transferring light generated by the scintillation crystal to externally coupled photo multiplier tubes or photodetection apparatus.

The present invention discloses a novel extended lifetime scintillation camera plate assembly comprising a scintillation crystal having a plurality of scintillating elements to receive the incoming radiation and produce light, and a plurality of light pipe elements coupled to the scintillating elements to receive and guide the light, and a frame which is sealed around the scintillation crystal.

In addition, the invention teaches a method for constructing the above-described gamma camera plate assembly, whereby the scintillating elements are optically coupled with the light pipe elements and the light output from the scintillating elements is optimized.

These and various other objects and advantages of the inventive extended lifetime gamma camera plate assembly will become apparent to those skilled in the art from a consideration of the following detailed description of a preferred embodiment and appended drawings which will be briefly described.

BRIEF DESCRIPTION OF THE DRAWINGS

FIG. 1 is an isometric view of an extended lifetime gamma camera plate assembly;

FIG. 2 is a transverse cross-sectional view of a preferred exemplary embodiment of the present invention, taken along the line 2—2 of FIG. 1;

FIG. 3 is an enlarged fragmentary view of the right side of FIG. 2;

DETAILED DESCRIPTION OF A EXEMPLARY PREFERRED EMBODIMENT

Figure 5:
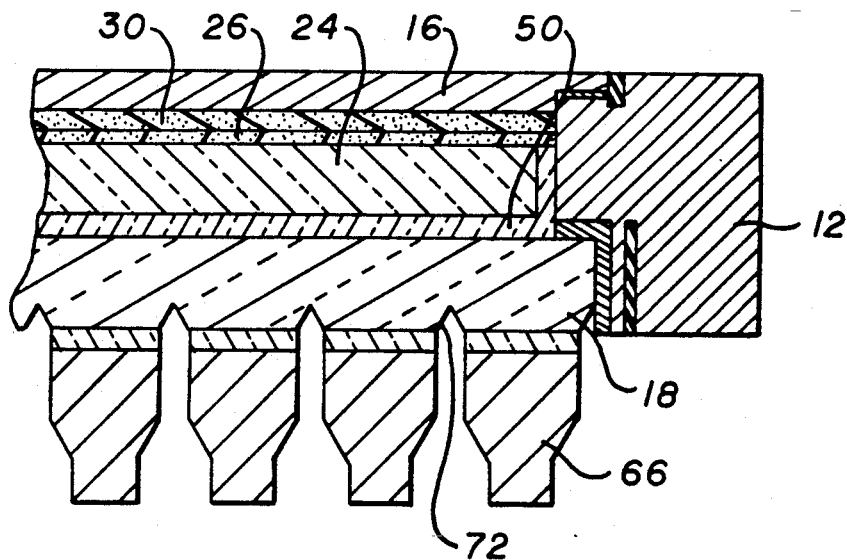
FIG. 5 shows an extension of the bottom portion of FIG. 2 showing yet another embodiment of the present invention.

Referring to the appended drawings, FIG. 1 shows a circular gamma camera plate assembly consisting of an outer ring 12 with an inner diameter of about 18 inches and an outer diameter of about 21 inches. Other shapes of the plate assembly may be utilized, e.g. square, rectangular, etc. depending on customer needs. Presently, the circular plate configuration is used by many gamma camera plate manufacturers because of its relatively longer life expectancy as compared to square or rectangular gamma camera plates.

Referring to FIG. 2, the ring consists of a front surface to which the optically transparent plate 14 will be mounted, and a rear surface which will be covered by an external cover 16 which is the x-ray window. There is an annular ring 18 cut into the front surface of the outer ring 12. This annular ring is cut to a depth approximately equal to the depth of the mounting shelf 19 for the transparent plate 14 to be attached to the outer ring. Mounting shelf 19 is slightly deeper than the transparent plate is thick, such that the transparent plate sits substantially flush or slightly recessed with respect to the front surface of the outer ring when completely assembled. The annular ring 18 is cut near the transparent plate so as to leave a tab 20. The purpose of tab 20 is to provide thermal relief to the outer ring and transparent plate during assembly and during operation of the scintillation camera.

The circular optically transparent plate 14 is preferably comprised of pyrex glass and has an approximate thickness of ½ inch and an outer diameter slightly less than the inner diameter of outer ring 12 when measured just inside of tab 20. The pyrex plate is then placed inside the outer ring 12 and is initially laser welded or soldered, using a frit made of Indium-Tin Alloy or other suitable compound and being applied in the form of a paste or ribbon 22 according to instructions furnished by the frit manufacturer. The diameter of the pyrex glass plate 14 is determined by the soldering or welding requirements and space required by the Indium-Tin Alloy frit in order to make an effective seal between the transparent plate 14 and the outer ring 12. Indium-Tin Alloy manufactured by Indium Corporation of America, "INDALLOY" No. 2 or Indium-Tin, "INDALLOY" No. 1E are acceptable for this purpose. Numerous techniques are known for forming a glass to metal seal and all are useable to some degree, depending on the characteristics of the sealing technique. Pre-coating the pyrex glass plate with Platinum will also result in a superior seal which is easier to form.

A similar grove 42 is cut into the rear surface of the outer ring. The depth of grove 42 is slightly greater than the thickness of the cover plate 16. The purpose of this grove is to allow excess solder, frit, etc. to drain away from the scintillation plate. A flat region 41 is located between flange 40 and grove 42. This flat region provides an area for soldering or welding the cover plate 16 to the outer ring 12. When the assembly is complete, the cover plate should be nearly flush with the outer ring.

The outer ring 12 used in the preferred embodiment is manufactured of stainless steel (SS-304 or SS-316), but may also be constructed of aluminum or other appropriate metal, ceramic or other suitable material. While Indium-Tin Alloy is preferred, small quantities of antimony, (1%-8%) may be added to insure an optimal metal-to-glass seal. The exact quantity of antimony would depend on the particular stainless steel and pyrex glass utilized.

In the preferred embodiment, the flange or frame has a thickness of approximately 0.937 inch and a radial extent of approximately 1.695 inches. Thermal insulation consisting of tab 20 for the transparent plate 14. The ring provides thermal isolation during welding or soldering. Rubber filler 28 consisting of silicon sealant or RTV is applied in recess 18 situated next to tab 20. Rubber filler 32 is also applied in recess 42 on the rear side of the ring next to tab 40. The same type of rubber filler is used on both sides.

An optical coupler 50 having an index of refraction close to that of the transparent plate, here approximately 1.5, is then applied to the inside surface of the pyrex glass plate. It is desirable to convey all of the light generated in the scintillation crystal through media having the same index of refraction. This will prevent distortion of the light rays, especially at interfaces between different types of material. For this purpose, clear silicon sealant having a refractive index of between 1.42 and 1.58 is applied in liquid form to the inside of the pyrex transparent plate. A thickness of 1-2 micrometers is sufficient. The scintillation crystal 24 is then placed on the optical coupler, and the optical coupler is allowed to cure. It is important that there are no bubbles or other pockets of air located between the transparent plate 14 and the scintillation crystal 24. A variety of materials are acceptable for use as optical couplers. At the present time, Dow Corning Q2-3067 has been found to be an acceptable optical coupler. Dow Corning Q2-3067 has a refractive index of 1.46 at a wavelength of 589 nanometers, and takes approximately 24 hours to cure.

At this point, it is desirable to apply a coating to the top surface of scintillation crystal 24 which is reflective to the light generated by the scintillation crystal, yet does not deflect or otherwise interfere with the incident radiation. A thin layer of Aluminum Oxide ($Al_2O_3$) or Magnesium Oxide (MgO) is applied to one side of a resilient material such as foam rubber 30. The layer of aluminum oxide or magnesium oxide should completely cover one surface of the foam rubber 30 and should be nearly uniform. This reflective surface 26 is then placed on top of the scintillation crystal 24. An external cover 16 made of aluminum plate, 0.050" in thickness is then placed on top of the foam rubber. The aluminum external cover (the x-ray window) is then soldered or welded to flange 40. The foam rubber 30 rests against the inner surface of the external cover.

The foam rubber helps to cushion the camera plate during transportation and installation.

An optical coupler is not required between the scintillation crystal and the reflective surface, but can easily be applied.

The external cover 16 is soldered or welded using a frit 46 comprised of Indium-Tin or other suitable compound. In the preferred embodiment, the thinnest external cover 16 and thinnest pyrex glass 14 are employed to provide for increased sensitivity and resolution.

This device eliminates the need for epoxy resin or the like to seal the scintillation crystal 24 inside the mounting ring 12. The described solder or laser weld joints provide hermetic sealing of the scintillation crystal and do not degrade when exposed to high temperature, temperature cycling, radiation, or moisture.

Epoxy resin sealing techniques were needed with older techniques because of the different sequence of steps employed by manufacturers during plate assembly. In particular, the glass to metal seal was always the last step, at which point no heat could be applied. Therefore the only sealer available was epoxy resin based.

Figure 4:
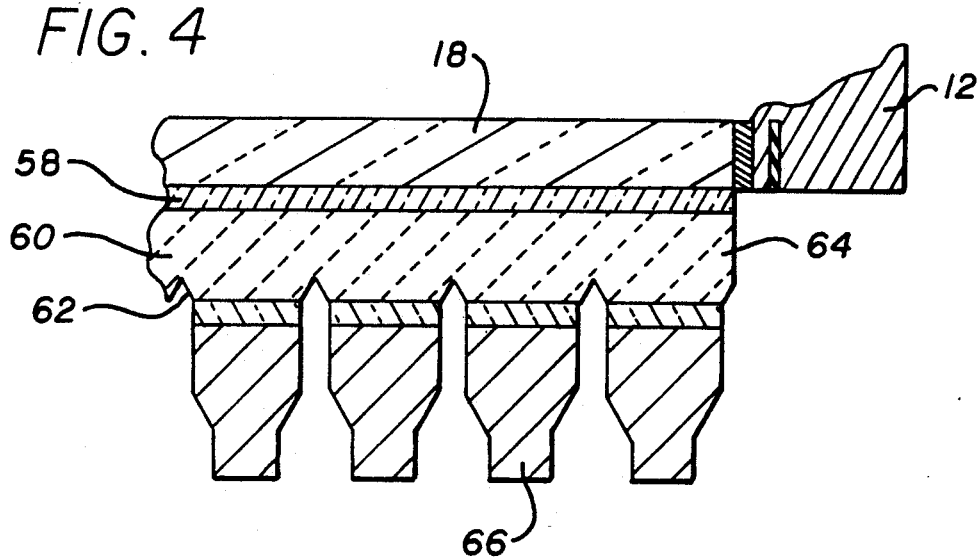
FIG. 4 is a fragmentary view of the bottom portion of FIG. 2, showing additional elements which may be included in a more comprehensive assembly.
Figure 6:
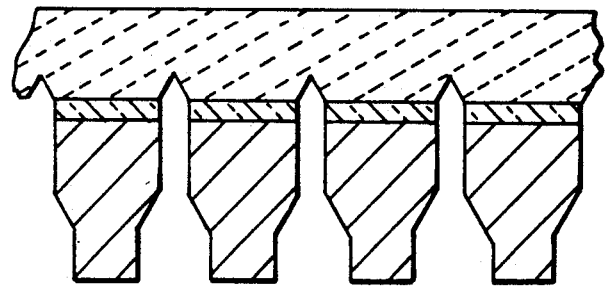
FIG. 6 shows a standard gamma camera plate assembly.

Another embodiment of the present invention is shown in FIG. 4 whereby glass plate 18 is optically coupled through an optional coupler 58 to a plexiglass light pipe 60. The plexiglass light pipe is shown with a series of U-shaped indentations with a mate surface finish 62 to avoid crosstalk (optically isolate the islands) and a series of islands 64 in between. The islands are placed for receiving a plurality of photodetectors 66. The configuration and dimensions of the U-shaped indentations and the islands are generally prepared according to customer specifications and the dimensions of the photodetectors selected. The light signal impinging the photodetector generates an electric signal for further image processing.

Yet another embodiment is shown in FIG. 5, whereby the optical coupler plate 58 of FIG. 4 is eliminated. The thickness of the transparent plate 18 is reduced resulting in a reduced loss of light and reduced diffraction. There is a corresponding increased image sensitivity of the gamma camera plate assembly. The plexiglass light pipe 60 of FIG. 4 may be coupled directly to the transparent plate 14 by forming or cutting indentations 72 in the transparent plate according to customer specifications, so as to allow the photodetectors 66 to attach directly to the transparent plant.

There are numerous variations from the preferred embodiment which can be implemented by those skilled in the art in keeping with the teachings of this invention. The reflective coating can be applied directly to the scintillation crystal. This can be done by spraying or a sputtering technique. Scintillation crystals having light output in different wavelengths may be employed. At the particular wavelengths selected, aluminum oxide or magnesium oxide may be transparent, or may be inefficient reflectors or to significantly different wavelengths. The pyrex glass plate may also be opaque for the particular wavelength of light selected. Metal Inert Gas (MIG) or Tungsten Inert Gas (TIG) welding may be used. More efficient optical couplers may be used. More efficient optical coupling material may be used. This optical coupling material may fully surround and encapsulate the scintillation crystal, especially if one side of the scintillation crystal has a reflective coating placed on it. This may eliminate the need for the resilient cushion which is interposed between the scintillation crystal and the cover plate. Other improvements and modifications may be made that will improve the resolution and sensitivity of the camera plate assembly by using thinner materials, and/or positioning the photodetector apparatus closer to the scintillation crystal, and by getting the scintillation crystal closer to the radiation source.

The shape and dimensions of the outer rings including the weld surfaces and heat/stress relief points may be varied, as may the thickness and size of the transparent plate, scintillation crystal, cover plate, as well as the method for and composition of the glass to metal seal, and the cover plate seal while still keeping with the spirit of the present invention. Further, the size, shape, method of sealing, material used for sealing, optical coupling material, material used to form the outer ring, cover plate, scintillation crystal, resilient cushion, reflective surface, or pyrex glass plate may all be varied from the dimensions and materials aforementioned in keeping with the principles and teachings of the present invention.

Additionally, the teachings of the present invention are applicable to Sodium Iodide and Cesium Iodide crystals used as nuclear detectors with a form factor is 1 to 3 inches in diameter and 1 to 3 inches in length, oil well drilling applications where the form factor is 2 to 3 inches in diameter and 9 to 12 inches long, as well as airport security x-ray systems (4 inch cubes), and numerous other applications.

There has been described hereinabove a novel apparatus and method for encasing a scintillation crystal within a gamma camera plate assembly in such a manner that the gamma camera plate assembly is hermetically sealed, and the scintillation crystal is not exposed to moisture or the outside environment according to the principles of the invention as described hereinabove. Those skilled in the art may now make numerous uses of and departures from the above described method and apparatus without departing from the inventive spirit and scope of the invention. Thus, by way of example and not of limitation, the apparatus may be employed to seal scintillation crystals within gamma camera plate assemblies using compounds or materials in addition to those disclosed herein.

I claim:

1. A scintillation camera plate assembly comprising:
   an outer ring having front and back sides;
   an annular ring or grove cut into the front of the outer ring, so as to create a thermal relief tab;
   a transparent plate fitted into the outer ring and located on the front surface of the outer ring and near the thermal relief tab, said transparent plate having an outer surface facing the same direction as the front surface of the outer ring, and an opposing inner surface;

a frit applied between the outer ring and the transparent plate and heated, to weld or solder the transparent plate to the outer ring;

a scintillation crystal which emits light when impacted by radiation placed against the inside surface of the transparent plate;

an annular ring or grove cut into the back of the outer ring so as to create a thermal relief ring;

a cover plate located towards the back of the outer ring; and a frit applied between the outer ring and cover plate and heated to weld or solder the cover plate to the outer ring.

2. A scintillation camera plate assembly as described in claim 1 and having an optical coupler having a refractive index close to that of the transparent plate applied to the inside surface of the transparent plate and being located between the transparent plate and the scintillation crystal;

3. A scintillation camera plate assembly as described in claim 1 also having a layer of reflective material located between the scintillation crystal and the cover plate, located adjacent to the scintillation crystal;

said reflective material being essentially transparent to impacting radiation, and substantially reflective to the wavelength of light emitted by the scintillation crystal when impacted by radiation.

4. A scintillation camera plate assembly as described in claim 3 in which the reflective material is Aluminum Oxide or Magnesium Oxide.

5. A scintillation camera plate assembly as described in claim 3 and also having a resilient cushion means to which the reflective material is applied.

6. A scintillation camera plate assembly as described in claim 1 in which the frit consists of an Indium-tin mixture.

7. A scintillation camera plate assembly as described in claim 6 in which Antimony in a small quantity is added to the Indium-tin frit to achieve a frit which is 12% or less Antimony, and the reminder approximately 50-50 Indium and tin.

8. An extended lifetime scintillation camera plate assembly comprising:

a frame comprising an outer ring having front and back sides, and having an opening surrounded by said outer ring;

an annular ring or groove cut into the front of the outer ring substantially encircling the opening in said frame, said annular ring located substantially adjacent to said opening;

a transparent plate fitted into the outer ring and located on the front surface of the outer ring and near the annular ring;

a frit applied between the outer ring and the transparent plate and heated, to weld or solder the transparent plate to the outer ring;

a radiation processing means disposed in said opening within said frame to convert the impinging radiation into light; and a light conducting means disposed in said opening within said frame, sealed to said frame and coupled to said radiation processing means to receive the guide light generated by said radiation processing means.

9. A scintillation camera plate assembly as described in claim 8, further including a reflecting means disposed adjacent to the radiation processing means to reflect the light generated by the processing means, whereby light output is optimized.

10. A scintillation camera plate assembly as described in claim 9, wherein said reflecting means consists of a layer of Magnesium Oxide or Aluminum Oxide.

11. A scintillation camera plate assembly as described in claim 8, including an optical coupling means to couple the processing means to the light conducting means wherein said optical coupling means comprises a compound having a refractive index close to the refractive index of the light guiding means.

12. A scintillation camera plate assembly as described in claim 8 wherein said sealing means comprises a welded or soldered joint.

13. A scintillation camera plate assembly as described in claim 8, wherein said sealing means further comprises a frit made of Indium-Tin welded or soldered to the frame and body.

14. A scintillation camera plate assembly as described in claim 8, in which said optical coupling means incorporates the characteristics of said light pipe, allowing photodetectors to be directly coupled to said optical coupling means.

15. A scintillation camera plate assembly comprising:

an outer metallic ring having front and back sides;

a transparent plate fitted into the outer ring and located on the front surface of the outer ring, said transparent plate having an outer surface facing the same direction as the front surface of the outer ring, and an opposing inner surface;

an annular ring or groove cut into the front of said outer metallic ring substantially encircling said transparent plate and located substantially adjacent to said transparent plate;

a direct metallic bond between the outer ring and the transparent plate;

a scintillation crystal which emits light when impacted by radiation placed against the inside surface of the transparent plate;

a cover plate located towards the back of the outer ring; and a direct metallic bond between the outer ring and cover plate.

16. A scintillation camera plate assembly as described in claim 15 and further comprising an annular ring or groove cut into the back of the outer metallic ring substantially encircling said cover plate, and located substantially adjacent to said cover plate.

17. A scintillation camera plate assembly as described in claim 15 and having an optical coupler having a refractive index close to that of the transparent plate applied to the inside surface of the transparent plate and being located between the transparent plate and the scintillation crystal.

18. A scintillation camera late assembly as described in claim 15 also having a layer of reflective material located between the scintillation crystal and the cover plate, located adjacent to the scintillation crystal;

said reflective material being essentially transparent to impacting radiation, and substantially reflective to the wavelength of light emitted by the scintillation crystal when impacted by radiation.

19. A scintillation camera plate assembly as described in claim 18 in which the reflective material is Aluminum Oxide or Magnesium Oxide.

20. A scintillation camera plate assembly as described in claim 18 and also having a resilient cushion means to which the reflective material is applied.

21. A scintillation camera plate assembly as described in claim 15 in which the frit consists of an Indium-tin mixture.

22. A scintillation camera plate assembly as described in claim 21 in which Antimony in a small quantity is added to the Indium-tin frit to achieve a frit which is 12% or less Antimony, and the remainder approximately 50%–50% Indium and tin.

* * * * *